United States Patent [19]

Krasnoff et al.

[11] 4,338,192
[45] Jul. 6, 1982

[54] CLARIFIER BUBBLE GENERATION AND DISTRIBUTION NOZZLE

[75] Inventors: Eugene L. Krasnoff; Oscar Luthi, both of Nashua, N.H.

[73] Assignee: Ingersoll-Rand Company, Woodcliff Lake, N.J.

[21] Appl. No.: 159,869

[22] Filed: Jun. 16, 1980

Related U.S. Application Data

[63] Continuation of Ser. No. 970,552, Dec. 18, 1978, abandoned.

[51] Int. Cl.³ ............................................. B03D 1/00
[52] U.S. Cl. ............................. 210/221.2; 210/703
[58] Field of Search ............... 210/44, 220, 221 P, 210/703, 221; 261/121 R, 123; 239/453, 456, 512, 524

[56] References Cited

U.S. PATENT DOCUMENTS

| | | | |
|---|---|---|---|
| 3,846,299 | 11/1974 | Krasnoff | 210/44 |
| 3,958,760 | 5/1976 | Rosenberg | 239/524 X |
| 4,040,975 | 8/1977 | Wittersheim | 261/121 R |

*Primary Examiner*—Frank A. Spear, Jr.
*Attorney, Agent, or Firm*—Frank S. Troidl

[57] ABSTRACT

The nozzle is used with a system for removing contaminants from a liquid including a source of dissolved air in water under pressure and includes a first member with a hole through which the dissolved air and water flows. A floating member is also provided. The shapes of the first member and the floating member are such that the hydraulic forces resulting from the flow of water outwardly between the two members causes the floating member to float a predetermined distance from the first member. The shortest distance separating the first member and the floating member is such that most bubbles exiting from between the two members have a diameter less than 100 microns.

6 Claims, 5 Drawing Figures

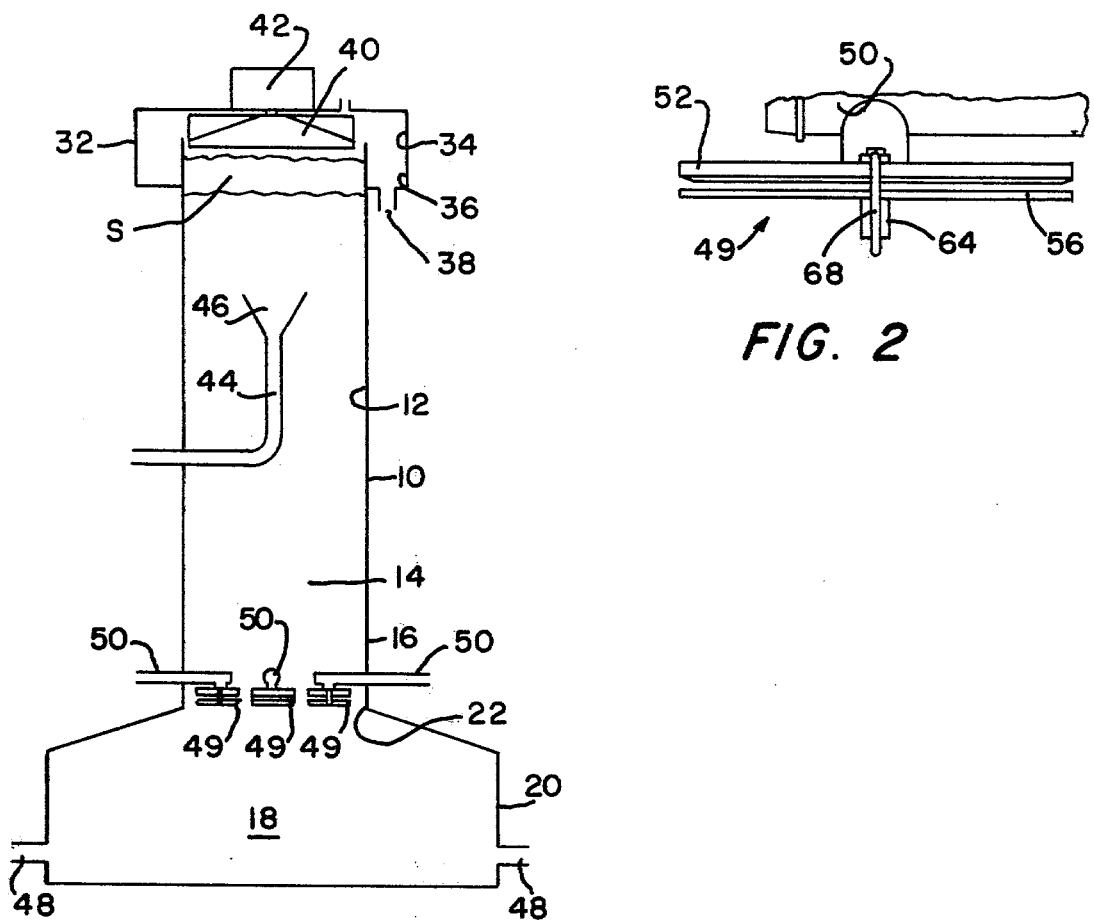
FIG. 1
FIG. 2
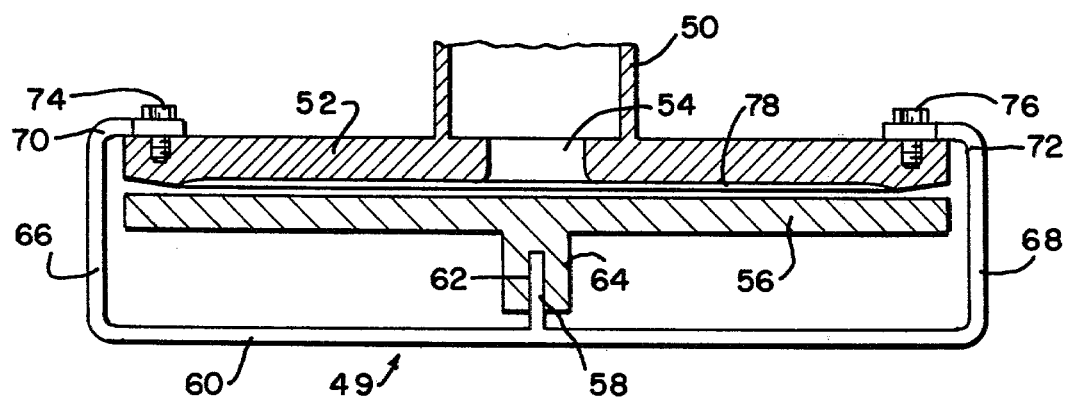
FIG. 3

CLARIFIER BUBBLE GENERATION AND DISTRIBUTION NOZZLE

This is a continuation of application Ser. No. 970,552 filed Dec. 18, 1978 now abandoned.

This invention relates to systems for separating suspended solids from liquids by dissolved air flotation. More particularly, this invention is a new bubble generation and distribution device for use with a solids-liquid suspension system including a source of dissolved air in water under pressure.

BACKGROUND OF THE INVENTION

Several processes are available to separate suspended solids from liquid. Filtration and centrifugation are the most frequently applied solid separation methods. This invention, however, is useful in the dissolved air flotation method of solid separation. In a dissolved air flotation unit the air is dissolved under pressure into the liquid. For example, at 80 PSI pressure and 30° C. about 7 times as much air can be dissolved than at atmospheric pressure. When the pressurized liquid is exposed to atmospheric pressure the excess air will come out of the pressurized liquid in the form of small air bubbles. The air bubbles collide with the suspended solid particles and become attached by absorption, entrapment and adhesion. The specific gravity of these particle-air bubble agglomerates is less than that of water so that they will rise to the surface forming a solid blanket. The clarified liquid is withdrawn from the tank as effluent.

For efficient operation of a dissolved air flotation unit, it is highly important that the bubbles coming out of the pressurized liquid are not too big. With smaller diameter bubbles, of course, more bubbles are formed for a given amount of air than with larger diameter bubbles thereby increasing the number of bubbles in a system for a given amount of air. Also, it has been found that when the bubbles become too large in diameter the small solids do not become attached to the bubbles and hence are not removed from the system. Most bubbles will range on the small side to about 30 microns in diameter and the major part of the bubbles should not exceed 100 microns.

BRIEF SUMMARY OF THE INVENTION

Our new bubble generation and distribution nozzle produces bubbles with most of the bubbles having a diameter less than 100 microns.

The new invention is an apparatus for use in a system for removing contaminants from a liquid with this system including a source of dissolved air in water under pressure. The apparatus includes a first member having a hole through which the dissolved air-in-water flows. A solid member is also included in the apparatus. Means limit the axial movement of the solid member away from the first member while permitting axial movement of the solid member toward and away from the first member. Either the first member or the solid member has a recess formed on the surface facing the other member. The recess is shaped so that the hydraulic forces resulting from the flow of water outwardly between the two members are such that the solid member floats a predetermined distance from the first member. The shortest distance separating the first member and the solid member is such that most bubbles exiting between the two members have a diameter less than 100 microns.

BRIEF DESCRIPTION OF DRAWINGS

The invention as well as its many advantages will be further understood by reference to the following detailed description and drawings in which:

FIG. 1 is an elevational view illustrating a flotation separator and showing the location of the new bubble generation and distribution nozzle in a flotation separator;

FIG. 2 is an elevational view of a preferred embodiment of the invention;

FIG. 3 is an elevational view, on an enlarged scale and partly in section, of the embodiment of FIG. 2.

DETAILED DESCRIPTION OF THE INVENTION

Figure 4:
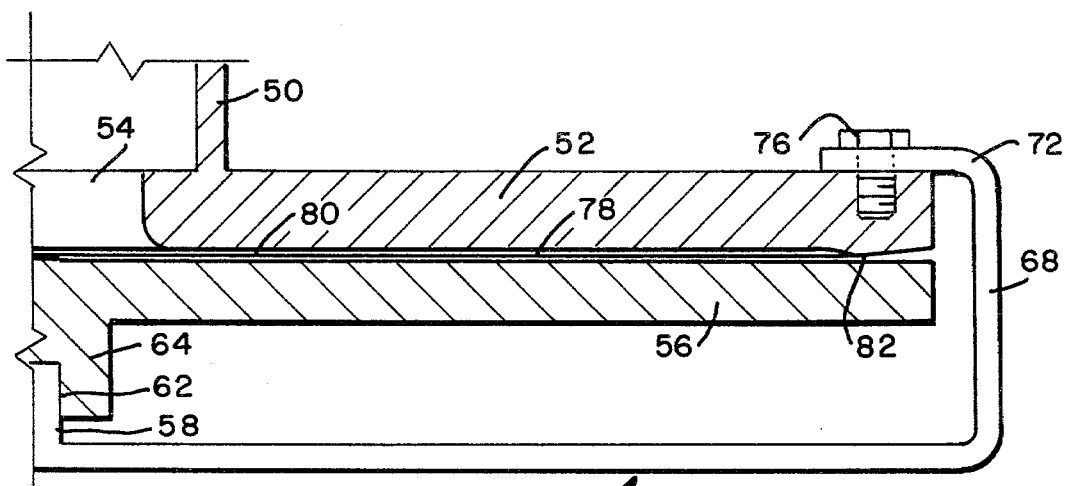
FIG. 4 is an elevational view, on an enlarged scale and partly in section, showing half of the preferred embodiment.

In the various figures, like parts are referred to by like numbers.

Referring to the drawings and more particularly to FIG. 1 a clarifying apparatus is shown comprising a vessel 10 containing a vertically elongated clarification chamber 12. The clarifying chamber 12 includes a first or upper portion 14 contained within an annular vessel wall 16 and a second or lower portion 18 contained within the base or lower end 20 of the vessel 10 which is immediately below the cylindrical open lower end 22 of the chamber portion 14 and entirely open to communication with the lower end 22.

A solid material or sludge discharge means designated generally as 32 is operatively associated with the upper end of the chamber upper portion for discharging separated solid material therefrom. The solid material discharge means 32 comprises an annular circumferential discharge chamber 34 provided with a discharge outlet 36 connected to a discharge conduit 38 which is open to the upper end of the chamber upper portion 14 and a rotary top scraper 40 which is rotatibly driven by a motor 42.

The influent water supply means of the apparatus 10 comprises an influent water supply conduit 44 communicating with a source (not shown) of the influent water. The upper end of the conduit 44 terminates in an upwardly facing diffuser nozzle 46.

The periphery of the chamber lower portion 18 is provided with liquid discharge outlets 48 arranged to discharge liquid from the lower end of the chamber lower portion 18.

During the operation of the apparatus, the influent water to be clarified is continuously generally upwardly supplied into the chamber upper portion 14 through the conduit 44 and diffuser nozzle 46. Simultaneously, dissolved air-in-water from a source (not shown) is conducted through conduit 50 and exit from nozzles 49 as air bubbles. The scale and intensity of the fluid turbulence in the region of the nozzles 49 are controlled to provide good flocculation and bubble attachment conditions. Most of the bubbles cooperate to form a rising cloud of fine gas bubbles extending completely across the cross-section of the chamber upper portion 14 while the accompanying carrier liquid passes downwardly to the outlets 48. The rising cloud of fine air bubbles effect flotation separation of particles of solid material from the influent water, the flotation separated particles rising to the upper end of the chamber upper portion 14 to form a sludge blanket "S" discharged from the upper end by the discharge means 32. The liquid part of the influent water and any accompanying particles of solid material which are not flocculated adjacent the upper end of the chamber upper portion 14 flow downwardly in chamber upper portion 14 counter to the rising cloud of gaseous bubbles through the interstices or tortuous paths between the individual bubbles of the cloud.

As shown in FIG. 2, FIG. 3 and FIG. 4, the new nozzle 49 includes a first member or disc 52 with a circular hole 54 (See FIG. 3) along its axis. The disc 52 is coaxial with the end of the conduit 50. The nozzle also includes a solid disc 56 axially spaced from the disc 52. The axial movement of the disc 56 away from the disc 52 is limited by a post 58 integral with and extending upwardly from a wire bracket 60. The post 58 extends snugly into a bore 62 extending upwardly from the lower end of a hub 64 of the floating disc 56. The bracket 60 includes two vertical portions 66 and 68 and inwardly turned portions 70 and 72 connected to the vertical portions 66 and 68 respectively. Portions 70 and 72 are bolted to the top of the disc 52 by means of bolts 74 and 76 respectively.

Figure 5:
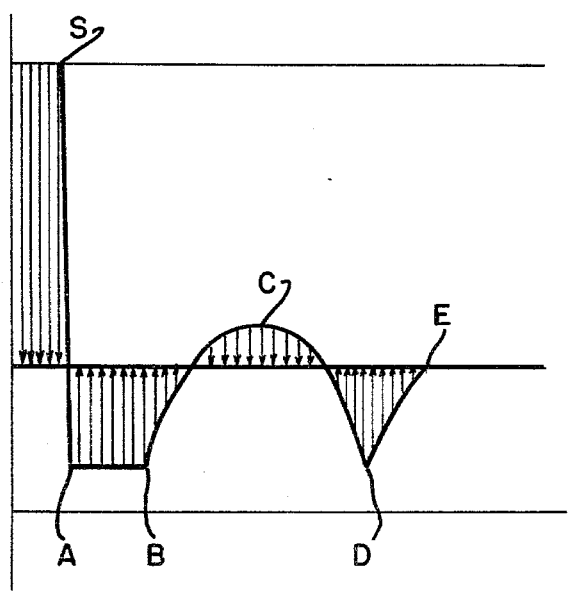
FIG. 5 is a hydraulic pressure profile of the embodiment shown in FIG. 2 through FIG. 4.

Disc 52 has a bowl shaped recess 78 at its lower end. The bowl shaped recess is shaped so that the hydraulic forces resulting from the flow of pressurized air-in-water outwardly between the discs 52 and 56 are such that the floating disc 56 will float a predetermined distance from the disc 52. In order for the disc to float, the sum of all of the hydraulic forces acting on the floating disc 56 must be zero. FIG. 5 shows a typical pressure profile for the nozzle of this invention. The supplied pressure may be, for example, about 100 PSIG. This is the pressure of the pressurized air-in-water as it leaves the hole 54 in disc 52. The pressurized air-in-water, of course, flows outwardly between the disc 52 and the floating disc 56. The exit pressure from between the disc 52 and disc 56 may be, say about, 2 PSIG which is close to atmospheric pressure. The actual discharge pressure is a function of the depths of the nozzles in the flotation clarifier. The large supply pressure pushes to separate the floating disc 56 from the disc 52. The supply hole 54 is dimensioned as small as possible to minimize this separating force. The pressure is then dropped quickly to below ambient pressure by accelerating the fluid to a large radial velocity. The bowl shape contour of the disc 52 also avoids cavitation pressures. A negative pressure "A" (See FIG. 5) is maintained for a short radial distance to point "B". At point "B" we are starting to convert velocity energy back into pressure until we reach point "C". From this point on, we are again dropping the pressure to gain as much velocity as possible at point "D", the point where floating disc 56 and disc 52 are the least separated. The short distance from "D" to "E" is required to bring the pressure back up to the small discharge pressure, of, say, 2 PSIG.

It is seen from the pressure diagram of FIG. 5 that there are two zones of positive pressure and two zones of negative pressure. The forces in these pressure zones plus the weight of the disc 56 must be carefully balanced to achieve a floating disc.

It is very important, of course, that the bubbles issuing from between the two discs be uniformly small bubbles. One criteria for obtaining the uniform small bubbles of less than 100 microns diameter is that the pressure between the two discs not reach a very low absolute pressure. The lowest pressure, looking at FIG. 5, of course, is at points A, B and D. In general, the base 80 of the recess or bowl 78 is no more than about 0.05 inches from the opposing surface of the floating disc 56 and the surface 82 forming the edge of the bowl or recess 78 no more than about 0.02 inches from the opposing surface of the floating disc 56. To achieve the smallest gap size for a given flow the following two requirements must be met:

(1) The point 82 of closest approach must be as close to the outside diameter as possible for maximum flow area and (2) The velocity must be as high as possible through the gap 82.

One preferred structure of the invention would include a pair of discs 52 and 56 having a radius of no more than about 6.5 inches with a surface 82 forming the edge of the bowl 78 of no more than about 1.0 inch from the outer periphery of the disc 52. Thus at a nozzle pressure of no more than about 100 PSIG the gap at point 82 would be about 0.02 inches and the gap of the surface 80 of the bowl 78 would be about 0.05 inches. Such a shaped nozzle produces a large amount of very fine bubbles of not more than about 100 microns in diameter.

Mode of Operation of Invention

In operation, looking at FIG. 1, the influent suspended solids is fed to the vessel 10 by means of conduit 44 and diffuser 46 and then flows downwardly in vessel 10. The pressurized air-liquid is super-saturated with air and is fed into the vessel 10 through conduit 50 and outwardly from the nozzles 49. As the pressurized air-in-liquid flows outwardly from between the discs of the nozzles 49 the near atmospheric pressure (around 2 PSIG) causes the air to come out of solution in the form of micro sized bubbles. The influent suspended solids flow countercurrent to the rising air bubbles. The air bubbles mix with suspended particles and the particles become attached to the bubbles. The bubbles act as a screen and achieve solid-liquid separation by flotation. The sludge blanket "S" is formed at the top of the vessel 10 and is removed by the mechanical scraper 40 while the effluent is continuously removed from the bottom of the vessel by means of conduit 48.

The specially shaped nozzles provide a maximum amount of small tiny bubbles for a given amount of air with a minimum of those bubbles being over 100 microns in diameter.

Though the figures show a recess or bowl shaped member in the disc 52 attached to the nozzle 50, if desired the disc 52 could have a flat bottom surface with the recess formed in the top of floating disc 56.

We claim:

1. A liquid purifier for removing contaminants from a liquid, comprising: a vessel; conduits for conducting pressurized dissolved gas in water into the vessel; a first member connected to each conduit and having a hole through which the dissolved gas in water flows; a solid member normally axially-spaced a predetermined distance from the first member to provide empty space between the first member and the solid member, said solid member having a bore extending upwardly from its lower end; and means including a post extending snugly into said bore for normally supporting said solid member away from said first member while permitting axial movement only of said solid member toward said first member in response to the flow of water outwardly through said empty space, one of said first member and said solid member having a recess formed on the surface facing the other member, said hole in the first member being dimensioned and said recess being shaped so that the axial pressures and the radial velocities of the water flowing outwardly through said empty space are such that the solid member moves axially toward the first member and floats a predetermined distance from the first member, said predetermined distance being such that the surface forming the edge of the recess is no more than about 0.02 inches from the opposing surface of the other member so that bubbles are formed with most bubbles exiting from between the first member and the solid member having a diameter less than 100 microns.

2. An apparatus in accordance with claim 1 wherein the first member has the recess.

3. An apparatus in accordance with claim 2 wherein the first number is a disc with the hole along its axis, the solid member is a floating disc, and the recess is an annular recess extending outwardly from the hole.

4. An apparatus in accordance with claim 3 wherein the surface forming the annular recess is bowl-shaped.

5. An apparatus in accordance with claim 4 wherein the surface at the base of the bowl is no more than about 0.05 inches from the opposing surface of the floating disc.

6. An apparatus in accordance with claim 5 wherein the radius of each of the discs is no more than about 6.5 inches and the surface forming the edge of the bowl is no more than about 1.0 inch from the outer periphery of the first member.

* * * * *